(12) United States Patent
Harrington

(10) Patent No.: US 6,583,897 B1
(45) Date of Patent: Jun. 24, 2003

(54) NON-LOCAL APPROACH TO RESOLUTION ENHANCEMENT

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,379

(22) Filed: Nov. 24, 1999

(51) Int. Cl.[7] .................. G06F 15/00; G06F 13/100
(52) U.S. Cl. .................. 358/532; 358/445; 358/447; 358/463; 358/464; 358/462; 382/181; 382/194; 382/267; 382/269; 382/274; 382/263; 382/266; 345/611
(58) Field of Search .................. 358/447, 445, 358/463, 464, 532, 462; 382/181, 194, 267, 269, 274, 263, 266; 345/611

(56) References Cited

U.S. PATENT DOCUMENTS 5,293,579 A * 3/1994 Stockholm .................. 358/447
5,611,023 A * 3/1997 Hanyu .................. 358/1.9
5,774,167 A * 6/1998 Hara .................. 347/131
6,154,576 A * 11/2000 Anderson et al. .......... 382/269

* cited by examiner

*Primary Examiner*—Edward Coles
*Assistant Examiner*—Alan Rahimi
(74) *Attorney, Agent, or Firm*—Fay, Sharpe, Fagan, Minnich & McKee, LLP (57) ABSTRACT

A method of smoothing edges of an input image is provided for use in connection with an image rendering engine that supports two opposing intensity levels and a range of intermediate intensity levels there between. The method includes sampling scan lines from the input image. Each scan line includes an array of pixels, and each pixel possesses one of the two opposing intensity levels. Simultaneously a plurality of the scan lines are buffered. Thereafter, the method includes detecting defined patterns in an unbounded region within the buffered scan lines. Finally, intensity levels of selected pixels are adjusted to intermediate intensity levels in response to the defined patterns detected.

16 Claims, 9 Drawing Sheets

NON-LOCAL APPROACH TO RESOLUTION ENHANCEMENT

BACKGROUND OF THE INVENTION

The present invention relates to the art of image processing. It finds particular application in conjunction with gray level printers, and will be described with particular reference thereto. However, it is to be appreciated that the present invention is also amenable to other image rendering engines which produce gray level outputs and like applications.

At times, with bi-level image rendering, desired smooth edges appear stepped or jagged due to pixel size and/or limited resolution. One way to address this undesirable artifact is by supporting a number of intermediate tones or gray levels at selected pixel locations rather than simply one of the two relatively extreme intensity levels. Several mechanisms for producing the gray levels are available, including, e.g., modulation of the pixel pulse-width of a laser in a laser printing or rendering device. Regardless of how they are produced, the gray levels can be used to soften or ease the abrupt transitions between pixel rows and/or columns of an image edge, particularly in the case of diagonal edges. Instead of stepping directly from, for example, white to black in the span of a single pixel, the transition can be drawn out over a number of pixels which gradually progress through a sequence of grays. In this manner, the edge appears smoother. This technique for removing jagged edges or "jaggies" is one form of anti-aliasing that makes lines and curves appear cleaner and smoother.

In the case then where one is working with a rendering engine that has the ability to produce a number of intermediate gray levels, the problem of determining which gray levels are to be rendered and which pixels are to be affected remains. Previously developed anti-aliasing edge-drawing algorithms are available which can produce the desired gray levels as part of the edge construction. However, this approach is limited insomuch as the image would have to be constructed for the particular rendering engine employed, and for the sake of compatibility with devices that do not support gray levels, it is desirable that the rendering engine accept the images without the gray level information. That is to say, one would like to use gray levels to enhance resolution, but to be able to deduce the specific manner of their use from examination of the bi-level image.

Figure 1:
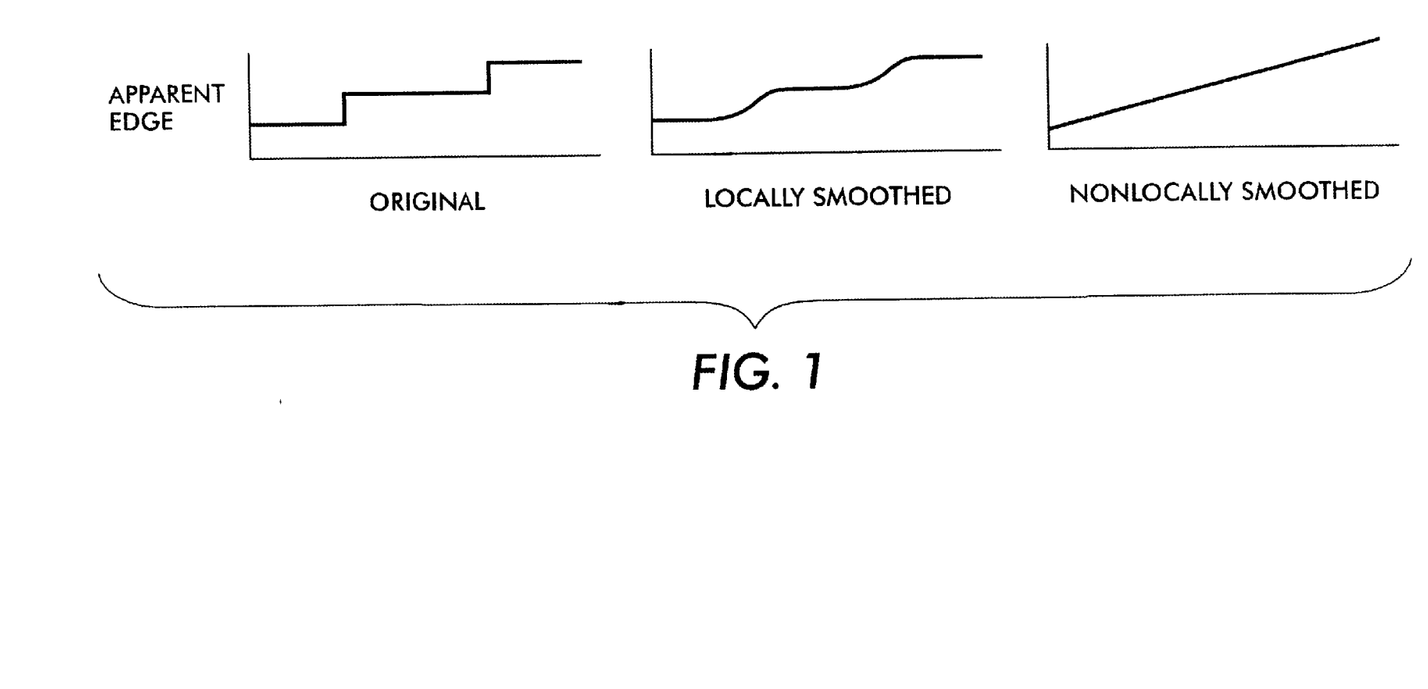
FIG. 1 is diagrammatic illustration comparing an original jagged diagonal edge and its locally smoothed counter part with results obtained after non-local smoothing in accordance with aspects of the present invention.

One known method address the problem at a confined local level. In this method, a local bounded window or tile is scanned across the image. At each location, the bitmap or pixel configuration within the window is compared to a collection of predefined specific patterns. When a match is found, the intensity levels of selected pixels within the window are adjusted to intermediate gray levels. Again, the approach is limited to localized smoothing insomuch as the effect cannot extend beyond the bounds of the window or the predefined pattern dimensions. For example, as depicted in FIG. 1, a diagonal edge having horizontal runs substantially longer than the dimensions of the window (while appearing smoothed at localized regions around the vertical jags) on the whole still appears stepped as the over all pattern characterizing the diagonal edge is beyond the scope of the window and/or predefined patterns.

Accordingly, the present invention contemplates a new and improved technique for anti-aliasing which overcomes the above-referenced problems and others.

SUMMARY OF THE INVENTION

In accordance with one aspect of the present invention, a method of smoothing edges of an input image is provided for use in connection with an image rendering engine that supports two opposing intensity levels and a range of intermediate intensity levels there between. The method includes sampling scan lines from the input image. Each scan line includes an array of pixels, and each pixel possesses one of the two opposing intensity levels. Simultaneously a plurality of the scan lines are buffered. Thereafter, the method includes detecting defined patterns in an unbounded region within the buffered scan lines. Finally, intensity levels of selected pixels are adjusted to intermediate intensity levels in response to the defined patterns detected.

In accordance with another aspect of the present invention, a method of smoothing edges in a bi-level image is provided. The method includes reading a plurality of scan lines. Each scan line includes an array of pixels, and each pixel possesses one of two opposing intensity levels. In each scan line, the method includes determining lengths of runs of adjacent pixels having like intensity levels. Based upon the determined lengths of runs, a defined pattern is located within the scan lines, and in response to locating the defined pattern, intensity levels of selected pixels are adjusted to intermediate levels between the two opposing intensity levels.

In accordance with another aspect of the present invention, an image processing system includes an image input terminal which reads in an input image. An image processing unit samples scan lines from the input image and simultaneously stores a plurality of the scan lines in a buffer. Each scan line includes an array of pixels possessing one of two opposing intensity levels. The image processing unit detects patterns in the scan lines stored in the buffer. The patterns are defined by transition locations in the scan lines where pixels change intensity levels, and runs of arbitrary length where a number of adjacent pixels extending along the scan lines have like intensity levels. Furthermore, the image processing unit adjusts intensity levels of selected pixels to intermediate intensity levels between the two opposing intensity levels based on the patterns detected. An image output terminal which supports the two opposing intensity levels and the intermediate intensity levels renders scan lines output from the image processing unit in accordance with the intensity levels prescribed thereby.

One advantage of the present invention is that it produces images with smooth edges extending over non-localized regions.

Another advantage of the present invention is its compatibility with imaging processing and/or rendering devices that do not support gray levels.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 2:
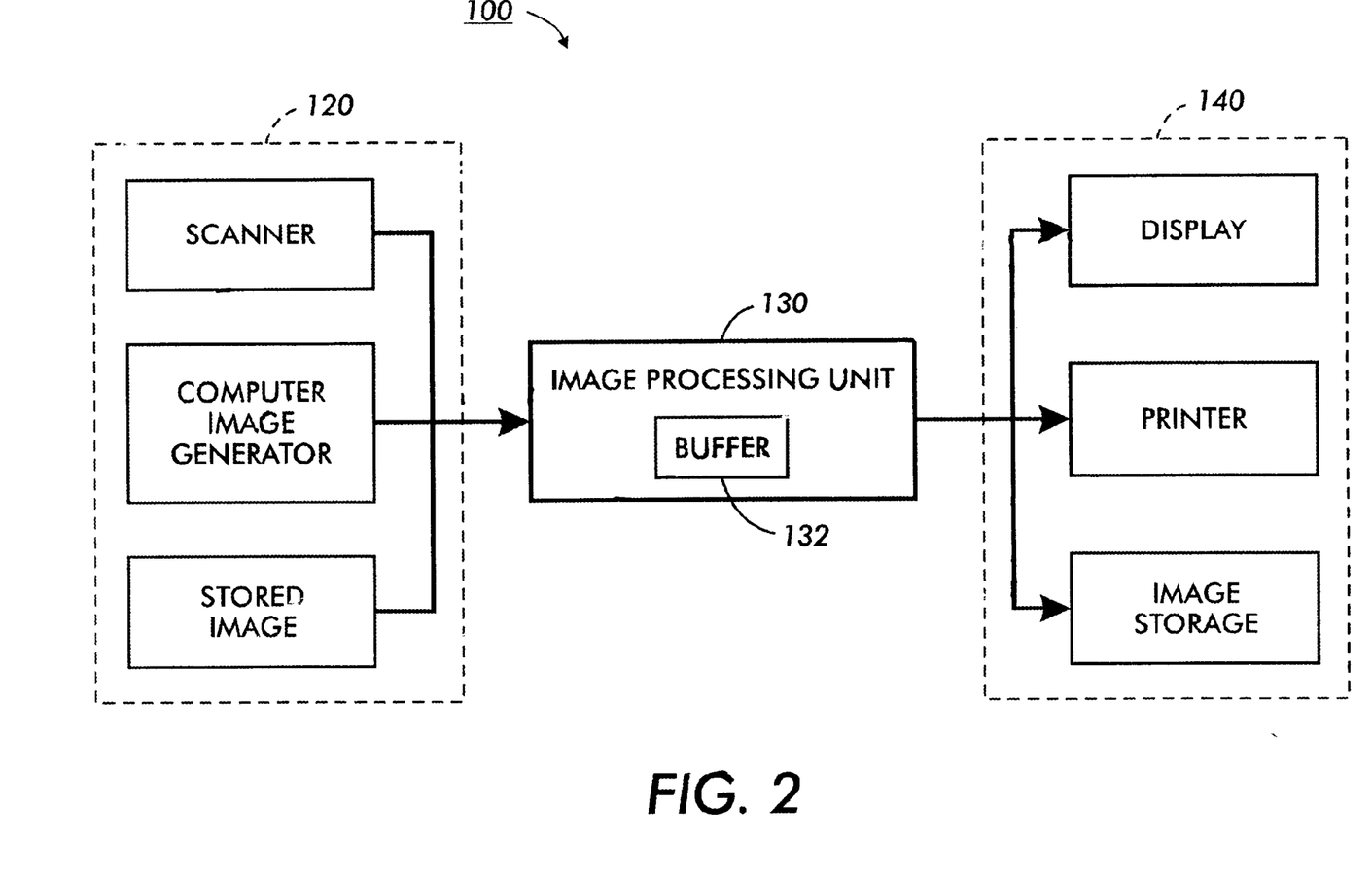
FIG. 2 is diagrammatic illustration of an image processing system for use in accordance with aspects of the present invention.

With reference to FIG. 2, an image processing system 100 employs an image input terminal 120 to read or otherwise receive an input image. The image input terminal 120 optionally includes one or more suitable image input devices such as an electronically or otherwise stored image reader, a computer image generator, a scanner, or the like which reads in the input image as bi-level pixels.

Along preferably horizontal scan lines, an image processing unit 130 samples the input image from the image input terminal 120. Where the entire image is simultaneously available from the image input terminal 120, the scan lines are optionally sampled along other orientations, e.g., vertically or diagonally. The image processing unit 130 carries out anti-aliasing or edge smoothing operations for edges whose orientations are near that of the sampling orientation (e.g., within plus or minus 45 degrees thereof). Thereafter, in accordance with the output from the image processing unit 130, an image output terminal 140 stores or renders the image. Optionally, the image output terminal 140 includes one or more appropriate rendering engines such as an image storage device, a printer, a video display monitor, or the like. In a preferred embodiment, the image output terminal 140 includes a rendering engine which is capable of rendering output image pixels at intermediate intensity levels or tones.

Figure 3:
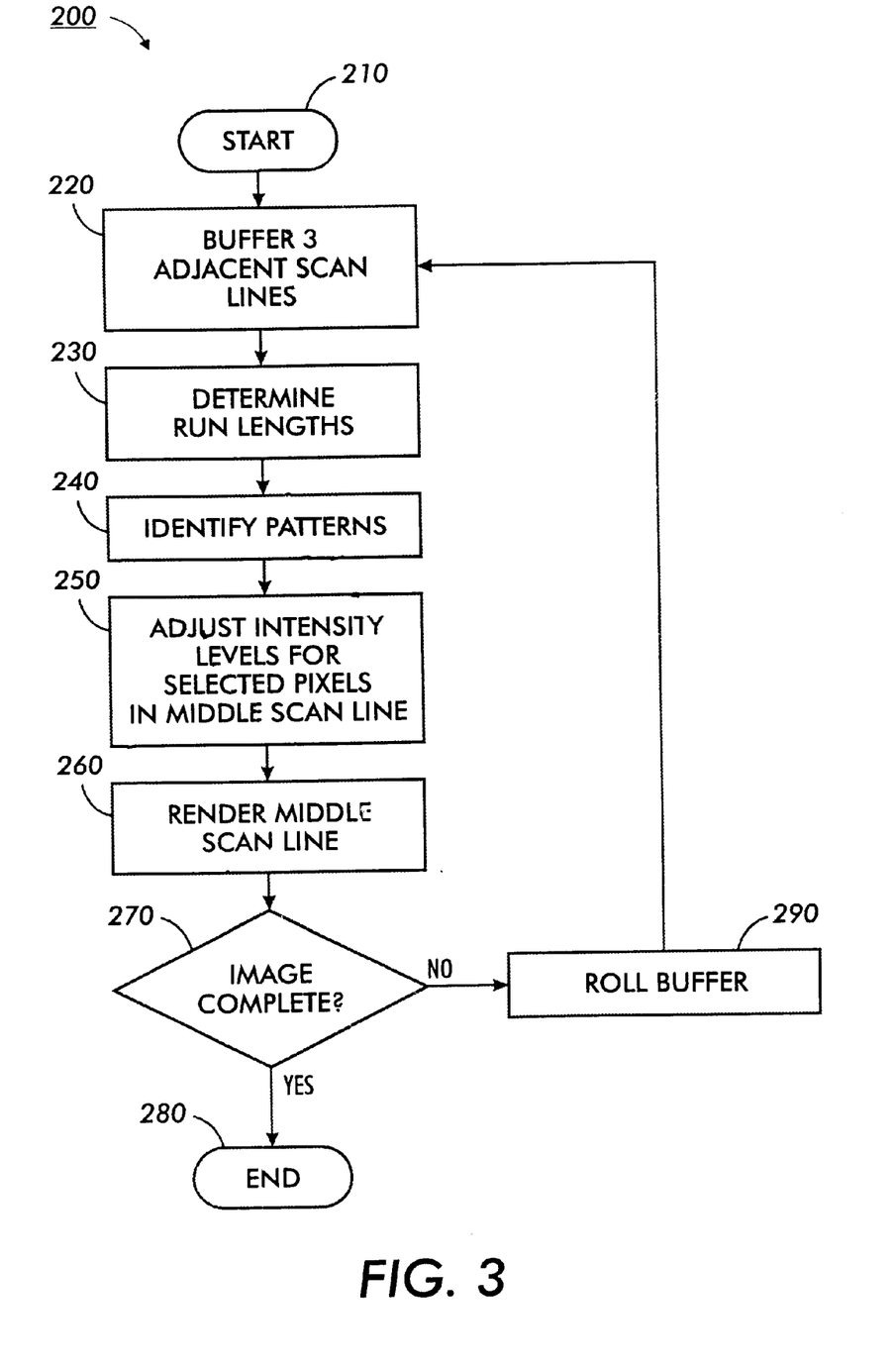
FIG. 3 is a flow chart showing an edge smoothing process in accordance with aspects of the present invention.

With further reference to FIG. 3, the smoothing operation or process 200 begins at step 210 by initializing the image processing unit 130 therefor. Next, at step 220, three adjacent scan lines (nominally termed herein the A, B, and C scan lines) are read into a rolling buffer 132. The data stored in the buffer 132 for each pixel in each scan line represents the intensity value for that pixel. In a preferred embodiment, the read in pixels have one of two opposing (preferably extreme) levels of intensity. As used herein for example, the opposing levels of intensity at their extremes are white and black. Alternately, the intensity levels are for a particular color separation (e.g., red, green, blue, etc.) or any pair of extremes defining a spectrum of tones on a line there between. In any event, the buffered data is then examined or otherwise analyzed in two passes preferably proceeding in opposing directions.

At step 230, in the first pass (which we shall consider for exemplary purposes herein as proceeding from right to left), the lengths of runs in each scan line are calculated or otherwise determined. A run is any sequence of adjacent pixels in a scan line that have like intensity values optionally, run length values for each pixel are saved or buffered along with the intensity values for each pixel.

Figure 4:
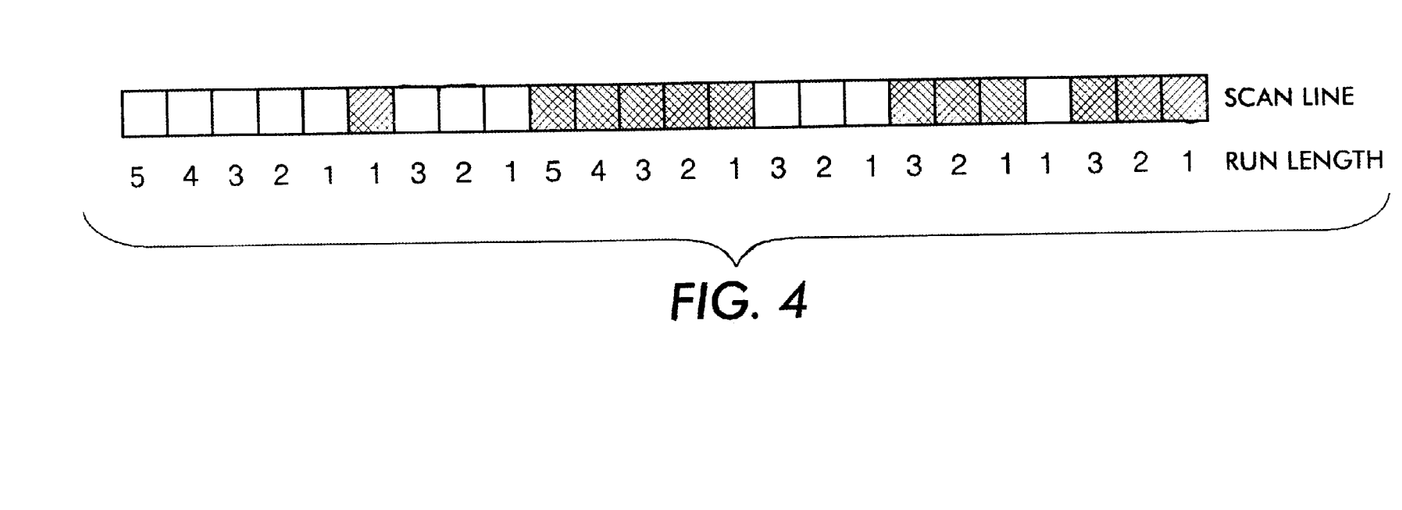
FIG. 4 is a diagrammatic illustration showing the pixels of an exemplary scan line and the assigned run length values in accordance with aspects of the present invention.

With further reference to FIG. 4, in a preferred embodiment, the run length value for each pixel in a scan line is determined by starting a counter and assigning its value to the pixel at the end of the scan line. With each step from pixel to pixel, the counter is incremented. In this manner, successive counter values are assigned as to consecutive pixels so long as the pixels' intensity values remain unchanged. Upon a change in intensity value, the counter is reset, and the run length value assignment process restarted for the new run. Accordingly, as viewed from left to right, the first pixel in each run is assigned a run length value equal to the total number of pixels in the run, subsequent pixels are assigned a run length value equal to the number of pixels from there on left in the run, and the last pixel in each run is assigned a run length value of one (thereby providing a ready indication of a transition in intensity value). Optionally, to conserve storage space and/or buffer memory, only the run length associated with the first pixel in each run is saved and the locations of transitions and other desired run length information is calculated or determined in relation thereto.

At step 240, with regard to the second pass, the data is preferably examined or analyzed in a direction opposite that of the first pass. For exemplary purposes herein, the second pass proceeds from left to right. In the second pass, the data is examined to locate defined patterns therein representing different types of edges. While the patterns are exemplified in FIGS. 5A through 5H, the patterns are defined by or based on the relative locations of particular transitions in intensity level and the relative locations of particular runs having arbitrary lengths. That is to say, the patterns are not defined by a fixed predefined configuration of pixels within a bounded window. In this manner then, the arbitrary run lengths contribute to the technique herein achieving its non-local behavior.

At step 250, in response to a detected, located, or otherwise identified pattern, selected pixels have their intensity values adjusted to one or more intermediate gray levels of intensity. In a preferred embodiment, the selected pixels are in the B scan line. Thereafter, at step 260, in accordance with adjusted intensity values, the B scan line is rendered.

Next at decision step 270, it is determined if the image has been completed, i.e., if further scan lines remain to be processed and/or rendered. If the decision is yes or affirmative, the processing continues on to step 280 where the process is ended. On the other hand, if the decision is no or negative, the process is repeated starting at step 220 after the buffer 132 has been rolled at step 290. Rolling the buffer 132 in this case means removing the A scan line from the buffer 132, advancing the original B scan line into the A scan line position, advancing the original C scan line into the B scan line position, and reading the next new scan line into the C scan line position.

Figure 5A:
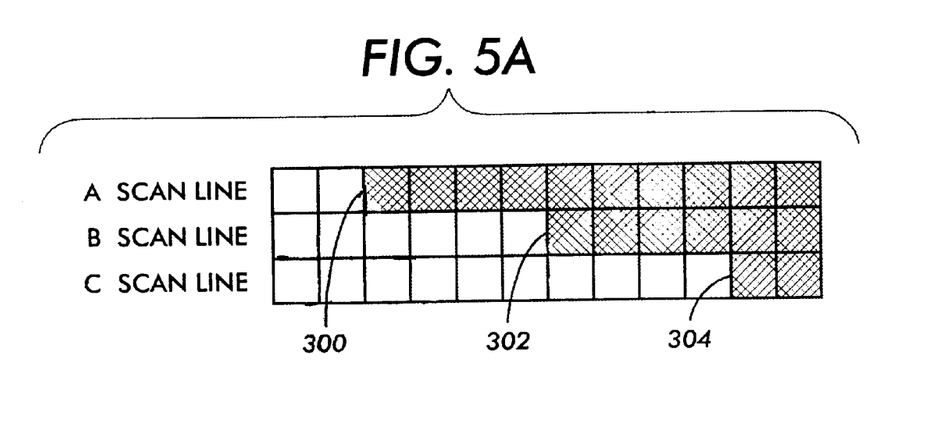
FIGS. 5A through 5H are diagrammatic illustrations showing exemplary patterns identified in buffered scan lines in accordance with aspects of the present invention.

Regarding the first pattern as exemplified in FIG. 5A, as the pattern is viewed from left to right, it is characterized by each scan line having a run of white followed by a run of black with three transitions from white to black occurring sequentially in each scan line from A to C, respectively. That is to say, the first transition 300 occurs in the A scan line, then the second transition 302 occurs in the B scan line, and then the third transition 304 occurs in the C scan line.

Figure 6A:
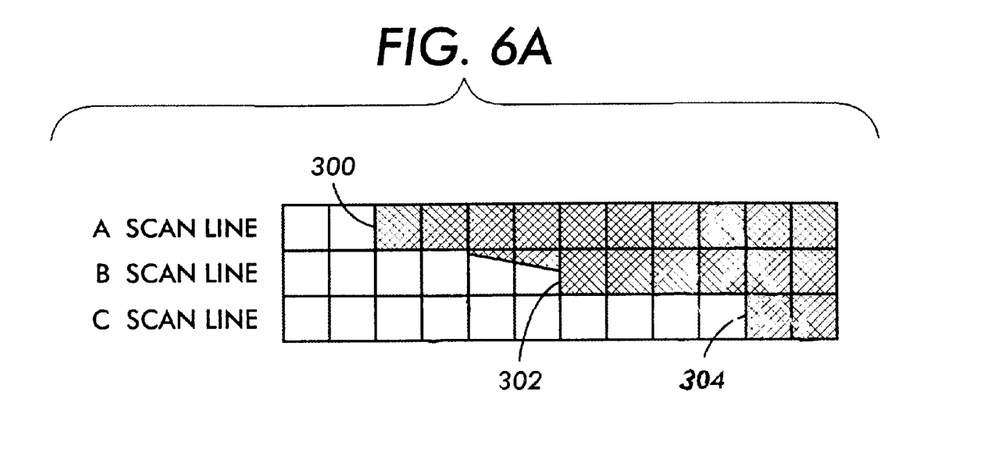
FIGS. 6A and 6B are diagrammatic illustrations showing adjusted intensity levels for selected pixels in accordance with aspects of the present invention upon the identification of the exemplary pattern shown in FIG. 5A.

The pattern illustrated in FIG. 5A represents a downward sloping edge transitioning from white to black. In a preferred embodiment, this edge is smoothed by identifying the pixels in a later portion (preferably the later half) of the white run in the B scan line extending between the first transition 300 (i.e., the transition in the A scan line) and the second transition (i.e., the transition in the B scan line). These identified pixels are then adjusted so that their intensity levels gradually range from white to an intermediate gray level (preferably, a 50% intensity level). This state is represented in FIG. 6A by the pixels of interest being partially filled in to approximate their adjusted intensity levels.

Figure 6B:
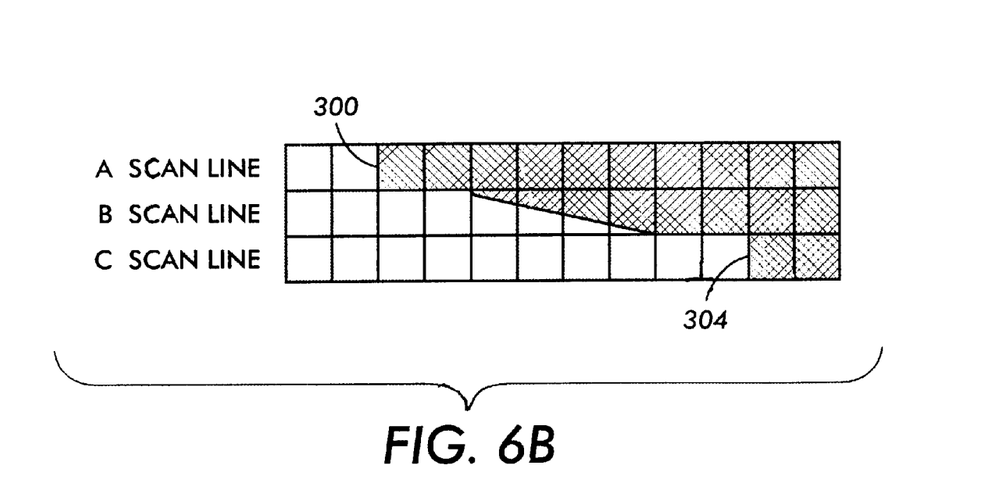

Also identified are the pixels in a portion (preferably the former half) of the black run in the B scan line extending between the second transition 302 (i.e., the transition in the B scan line) and the third transition 304 (i.e., the transition in the C scan line). These identified pixels are then adjusted so that their intensity levels gradually range from the intermediate gray level where the former adjustment left off (i.e., preferably a 50% intensity level) to black. See FIG. 6B showing the pixels of interest partially filled in to approximate their adjusted intensity levels.

As the lengths for each run of black and/or white in each scan line are available via the scan line buffer 132, the lengths of runs extending between any two transitions are readily calculated or otherwise determined by subjecting the relevant buffered run lengths to appropriate additive and/or subtractive operations.

Figure 5B:
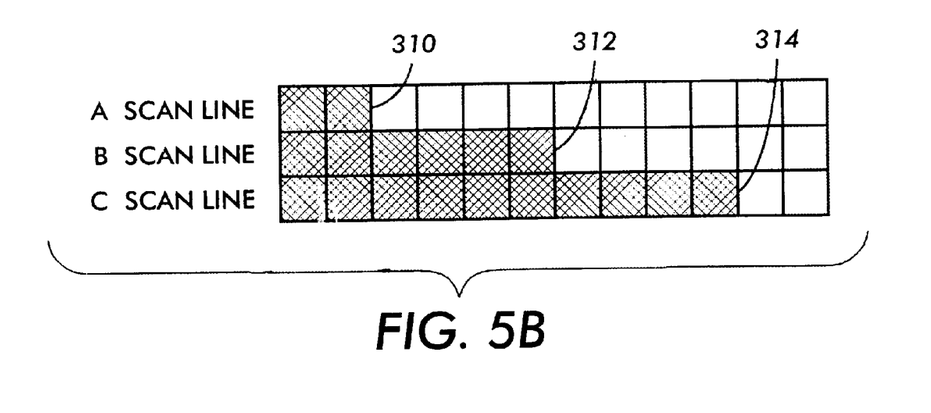

Regarding the second pattern as exemplified in FIG. 5B, as the pattern is viewed from left to right, it is characterized by each scan line having a run of black followed by a run of white with three transitions from black to white occurring sequentially in each scan line from A to C, respectively. That is to say, the first transition 310 occurs in the A scan line, then the second transition 312 occurs in the B scan line, and then the third transition 314 occurs in the C scan line.

The pattern illustrated in FIG. 5B represents a downward sloping edge transitioning from black to white. In a preferred embodiment, this edge is smoothed by identifying the pixels in a later portion (preferably the later half) of the black run in the B scan line extending between the first transition 310 (i.e., the transition in the A scan line) and the second transition 312 (i.e., the transition in the B scan line). These identified pixels are then adjusted so that their intensity levels gradually range from black to an intermediate gray level (preferably, a 50% intensity level).

Also identified are the pixels in a portion (preferably the former half) of the white run in the B scan line extending between the second transition 312 (i.e., the transition in the B scan line) and the third transition 314 (i.e., the transition in the C scan line). These identified pixels are then adjusted so that their intensity levels gradually range from the intermediate gray level where the former adjustment left off (i.e., preferably a 50% intensity level) to white.

Figure 5C:
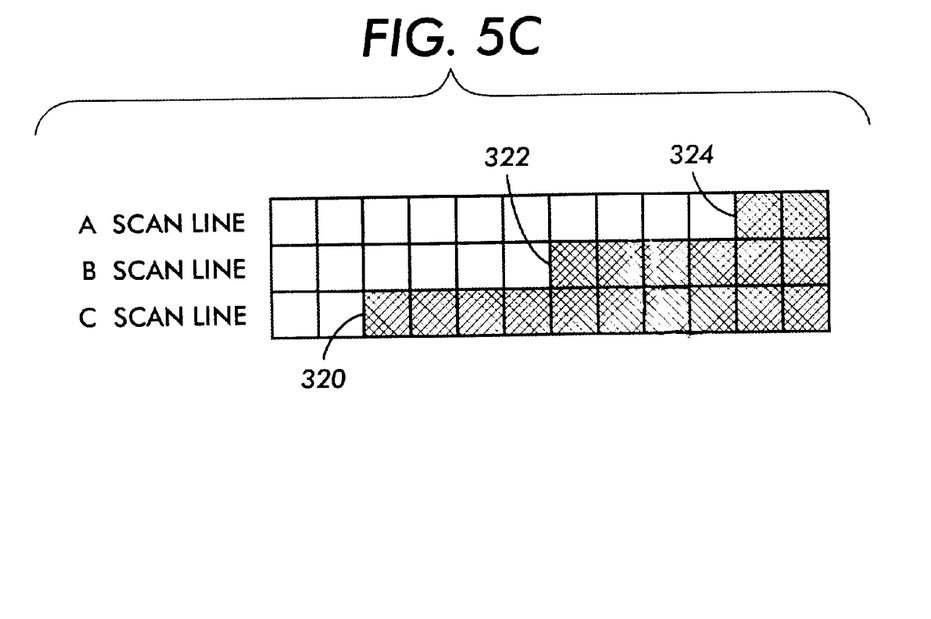

Regarding the third pattern as exemplified in FIG. 5C, as the pattern is viewed from left to right, it is characterized by each scan line having a run of white followed by a run of black with three transitions from white to black occurring sequentially in each scan line from C to A, respectively. That is to say, the first transition 320 occurs in the C scan line, then the second transition 322 occurs in the B scan line, and then the third transition 324 occurs in the A scan line.

The pattern illustrated in FIG. 5C represents an upward sloping edge transitioning from white to black. In a preferred embodiment, this edge is smoothed by identifying the pixels in a later portion (preferably the later half) of the white run in the B scan line extending between the first transition 320 (i.e., the transition in the C scan line) and the second transition 322 (i.e., the transition in the B scan line). These identified pixels are then adjusted so that their intensity levels gradually range from white to an intermediate gray level (preferably, a 50% intensity level).

Also identified are the pixels in a portion (preferably the former half) of the black run in the B scan line extending between the second transition 322 (i.e., the transition in the B scan line) and the third transition 324 (i.e., the transition in the A scan line). These identified pixels are then adjusted so that their intensity levels gradually range from the intermediate gray level where the former adjustment left off (i.e., preferably a 50% intensity level) to black.

Figure 5D:
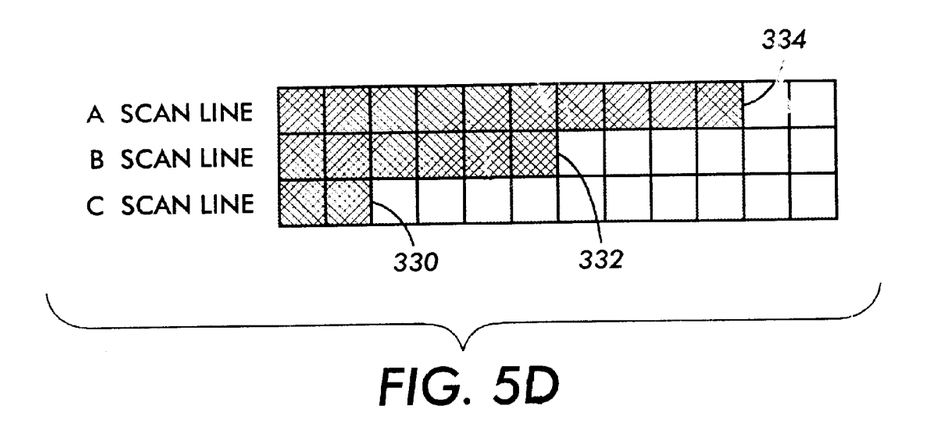

Regarding the fourth pattern as exemplified in FIG. 5D, as the pattern is viewed from left to right, it is characterized by each scan line having a run of black followed by a run of white with three transitions from black to white occurring sequentially in each scan line from C to A, respectively. That is to say, the first transition 330 occurs in the C scan line, then the second transition 332 occurs in the B scan line, and then the third transition 334 occurs in the A scan line.

The pattern illustrated in FIG. 5D represents an upward sloping edge transitioning from black to white. In a preferred embodiment, this edge is smoothed by identifying the pixels in a later portion (preferably the later half) of the black run in the B scan line extending between the first transition 330 (i.e., the transition in the C scan line) and the second transition 332 (i.e., the transition in the B scan line). These identified pixels are then adjusted so that their intensity levels gradually range from black to an intermediate gray level (preferably, a 50% intensity level).

Also identified are the pixels in a portion (preferably the former half) of the white run in the B scan line extending between the second transition 332 (i.e., the transition in the B scan line) and the third transition 334 (i.e., the transition in the A scan line). These identified pixels are then adjusted so that their intensity levels gradually range from the intermediate gray level where the former adjustment left off (i.e., preferably a 50% intensity level) to white.

Figure 5E:
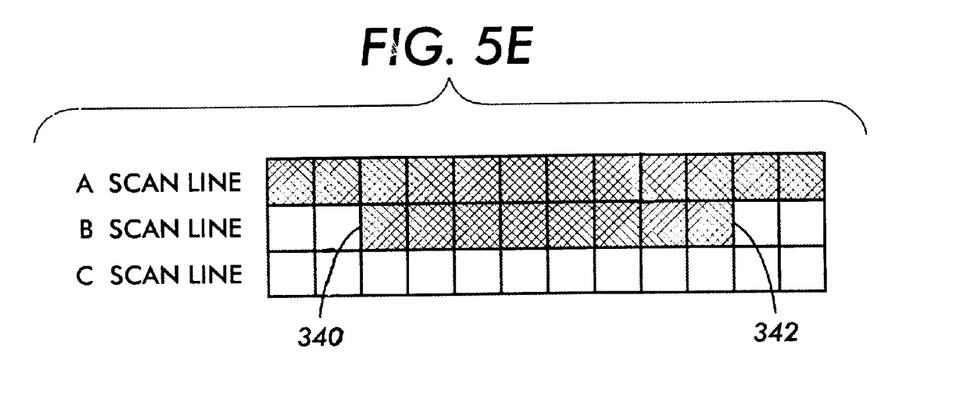

Regarding the fifth pattern as exemplified in FIG. 5E, as the pattern is viewed from left to right, it is characterized by the A scan line having a run of black, the B scan line having a first run of white followed by a run of black followed by a second run of white, and the C scan line having a run of white. That is to say, the pattern includes two transitions in the B scan line, the first transition 340 is from white to black, and the second transition 342 is from black to white.

The pattern illustrated in FIG. 5E represents a black edge changing over from downward sloping to upward sloping. In a preferred embodiment, on the downward sloping side, this edge is smoothed by identifying the pixels in a later potion (preferably the later half) of the first white run in the B scan line extending between the left end of the black run in the A scan line and the first transition 340 in the B scan line. These identified pixels are then adjusted so that their intensity levels gradually range from white to an intermediate gray level (preferably, a 50% intensity level). Also identified, are the pixels in a former portion (preferably the former quarter) of the black run in the B scan line. These identified pixels are then adjusted so that their intensity levels gradually range from the intermediate gray level where the former adjustment left off (i.e., preferably a 50% intensity level) to black. The pixels in the middle portion (preferably the middle half) of the black run in the B scan line remain unchanged.

On the upward sloping side, this edge is smoothed by identifying the pixels in a later potion (preferably the later quarter) of the black run in the B scan line. These identified pixels are then adjusted so that their intensity levels gradually range from black to an intermediate gray level (preferably, a 50% intensity level). Also identified, are the pixels in a former portion (preferably the former half) of the second white run in the B scan line extending between the second transition 342 in the B scan line and the right end of the black run in the A scan line. These identified pixels are then adjusted so that their intensity levels gradually range from the intermediate gray level where the former adjustment left off (i.e., preferably a 50% intensity level) to white.

Figure 5F:
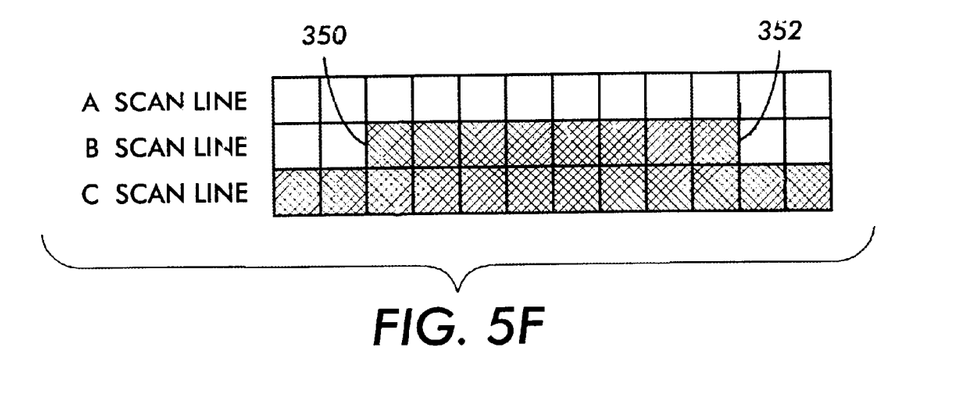

Regarding the sixth pattern as exemplified in FIG. 5F, as the pattern is viewed from left to right, it is characterized by the A scan line having a run of white, the B scan line having a first run of white followed by a run of black followed by a second run of white, and the C scan line having a run of black. That is to say, the pattern includes two transitions in the B scan line, the first transition 350 is from white to black, and the second transition 352 is from black to white.

The pattern illustrated in FIG. 5F represents a black edge changing over from upward sloping to downward sloping. In a preferred embodiment, on the upward sloping side, this edge is smoothed by identifying the pixels in a later potion (preferably the later half) of the first white run in the B scan line extending between the left end of the black run in the C scan line and the first transition 350 in the B scan line. These identified pixels are then adjusted so that their intensity levels gradually range from white to an intermediate gray level (preferably, a 50% intensity level). Also identified, are the pixels in a former portion (preferably the former quarter) of the black run in the B scan line. These identified pixels are then adjusted so that their intensity levels gradually range from the intermediate gray level where the former adjustment left off (i.e., preferably a 50% intensity level) to black. The pixels in the middle portion (preferably the middle half) of the black run in the B scan line remain unchanged.

On the downward sloping side, this edge is smoothed by identifying the pixels in a later potion (preferably the later quarter) of the black run in the B scan line. These identified pixels are then adjusted so that their intensity levels gradually range from black to an intermediate gray level (preferably, a 50% intensity level). Also identified, are the pixels in a former portion (preferably the former half) of the second white run in the B scan line extending between the second transition 352 in the B scan line and the right end of the black run in the C scan line. These identified pixels are then adjusted so that their intensity levels gradually range from the intermediate gray level where the former adjustment left off (i.e., preferably a 50% intensity level) to white.

Figure 5G:
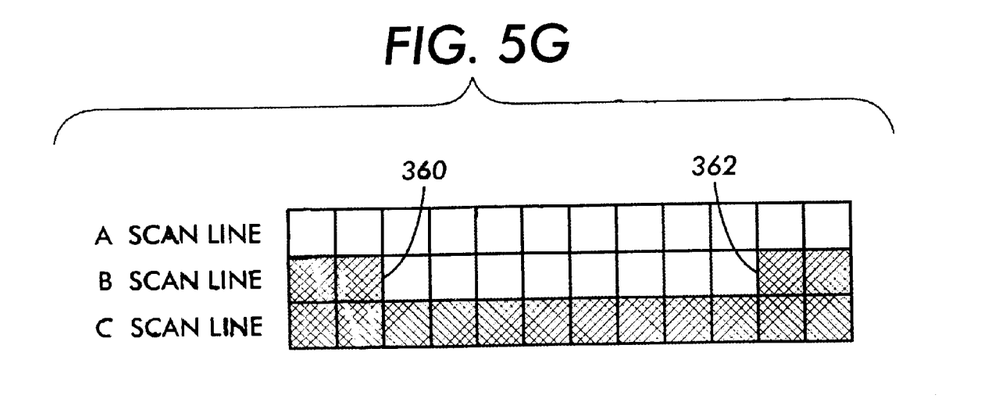

Regarding the seventh pattern as exemplified in FIG. 5G, as the pattern is viewed from left to right, it is characterized by the A scan line having a run of white, the B scan line having a first run of black followed by a run of white followed by a second run of black, and the C scan line having a run of black. That is to say, the pattern includes two transitions in the B scan line, the first transition 360 is from black to white, and the second transition 362 is from white to black.

The pattern illustrated in FIG. 5G represents a white edge changing over from downward sloping to upward sloping. In a preferred embodiment, on the downward sloping side, this edge is smoothed by identifying the pixels in a later potion (preferably the later half) of the first black run in the B scan line extending between the left end of the white run in the A scan line and the first transition 360 in the B scan line. These identified pixels are then adjusted so that their intensity levels gradually range from black to an intermediate gray level (preferably, a 50% intensity level). Also identified, are the pixels in a former portion (preferably the former quarter) of the white run in the B scan line. These identified pixels are then adjusted so that their intensity levels gradually range from the intermediate gray level where the former adjustment left off (i.e., preferably a 50% intensity level) to white. The pixels in the middle portion (preferably the middle half) of the white run in the B scan line remain unchanged.

On the upward sloping side, this edge is smoothed by identifying the pixels in a later potion (preferably the later quarter) of the white run in the B scan line. These identified pixels are then adjusted so that their intensity levels gradually range from white to an intermediate gray level (preferably, a 50% intensity level). Also identified, are the pixels in a former portion (preferably the former half) of the second black run in the B scan line extending between the second transition 362 in the B scan line and the right end of the white run in the A scan line. These identified pixels are then adjusted so that their intensity levels gradually range from the intermediate gray level where the former adjustment left off (i.e., preferably a 50% intensity level) to black.

Figure 5H:
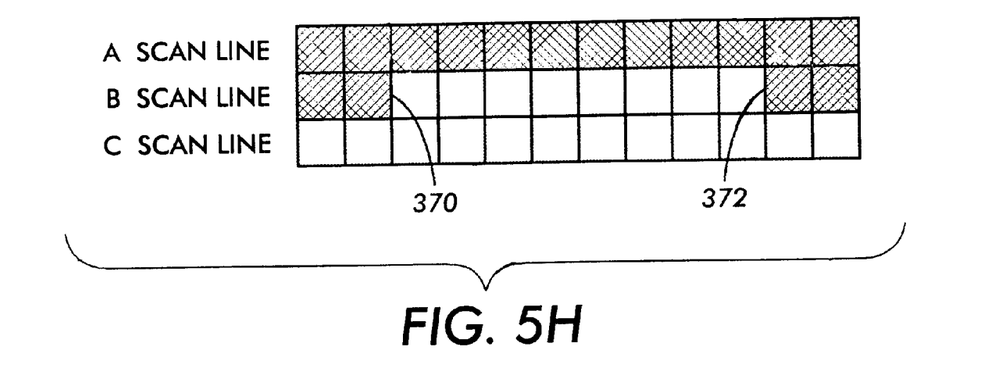

Regarding the eighth pattern as exemplified in FIG. 5H, as the pattern is viewed from left to right, it is characterized by the A scan line having a run of black, the B scan line having a first run of black followed by a run of white followed by a second run of black, and the C scan line having a run of white. That is to say, the pattern includes two transitions in the B scan line, the first transition 370 is from black to white, and the second transition 372 is from white to black.

The pattern illustrated in FIG. 5H represents a white edge changing over from upward sloping to downward sloping. In a preferred embodiment, on the upward sloping side, this edge is smoothed by identifying the pixels in a later potion (preferably the later half) of the first black run in the B scan line extending between the left end of the white run in the C scan line and the first transition 370 in the B scan line. These identified pixels are then adjusted so that their intensity levels gradually range from black to an intermediate gray level (preferably, a 50% intensity level). Also identified, are the pixels in a former portion (preferably the former quarter) of the white run in the B scan line. These identified pixels are then adjusted so that their intensity levels gradually range from the intermediate gray level where the former adjustment left off (i.e., preferably a 50% intensity level) to white. The pixels in the middle portion (preferably the middle half) of the white run in the B scan line remain unchanged.

On the downward sloping side, this edge is smoothed by identifying the pixels in a later potion (preferably the later quarter) of the white run in the B scan line. These identified pixels are then adjusted so that their intensity levels gradually range from white to an intermediate gray level (preferably, a 50% intensity level). Also identified, are the pixels in a former portion (preferably the former half) of the second black run in the B scan line extending between the second transition 372 in the B scan line and the right end of the white run in the C scan line. These identified pixels are then adjusted so that their intensity levels gradually range from the intermediate gray level where the former adjustment left off (i.e., preferably a 50% intensity level) to black.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of smoothing edges of an input image for use in connection with an image rendering engine that supports two opposing output values and a range of intermediate output values there between, said method comprising the steps of:

(a) sampling scan lines from the input image, each scan line including an array of pixels;

(b) simultaneously buffering a plurality of the scan lines;

(c) detecting within the buffered scan lines defined patterns of pixels, each of said defined patterns having a variable size which is undetermined prior to its detection; and, (d) adjusting output values of selected pixels to intermediate output values in response to the defined patterns detected.

2. The method according to claim 1, said method further comprising the steps of:

determining transition locations in each of the buffered scan lines where pixels change output values; and, determining run lengths for runs in each of the buffered scan lines, said runs being a number of adjacent pixels having substantially matching output values and including runs having run lengths greater than three pixels;

wherein the defined patterns are detected based upon the transition locations and run lengths.

3. The method according to claim 1, wherein the scan lines are sampled along a horizontal direction with respect to the input image.

4. The method according to claim 1, wherein the scan lines are sampled along a vertical direction with respect to the input image.

5. A method of smoothing edges in an image, said method comprising the steps of:

(a) reading a plurality of scan lines, each scan line including an array of pixels, each pixel having an intensity level;

(b) in each scan line, measuring lengths of runs of adjacent pixels having like intensity levels;

(c) based upon the measured lengths of runs, locating within the scan lines a defined pattern, wherein said defined pattern is of variable size and identifies two opposing intensity levels, and, (d) in response to locating the defined pattern, adjusting intensity levels of selected pixels to intermediate levels between the two opposing intensity levels.

6. The method according to claim 5, wherein the plurality of scan lines includes three adjacent scan lines in the following order: a first scan line, a second scan line, and a third scan line.

7. The method according to claim 6, wherein the selected pixels having their intensity levels adjusted are in the second scan line.

8. The method according to claim 7, wherein how many selected pixels are chosen is based upon the lengths of runs in the second scan line, said selected pixels representing defined portions thereof.

9. The method according to claim 5, wherein the selected pixels have their intensity levels adjusted such that they gradually progress between the two opposing intensity levels.

10. The method according to claim 5, wherein the step of measuring the lengths of runs in each scan line further comprises:

starting a counter on the pixel at one end of the scan line and repeatedly advancing to the adjacent pixels in the scan line while incrementing the counter;

repeatedly assigning the counter's value to its current pixel location so long as the intensity levels of the pixels which were advanced through remain unchanged; and, restarting the counter upon encountering a change in intensity level from one pixel to the next.

11. An image processing system, said image processing system comprising:

an image input terminal which reads in an input image;

an image processing unit which samples scan lines from the input image and simultaneously stores a plurality of the scan lines in a buffer, each scan line including an array of pixels, wherein said image processing unit (i) detects patterns of variable size in the scan lines stored in the buffer, said patterns being defined by transition locations in the scan lines where pixels change output values from a list of output value to a second output value and runs of arbitrary length where a number of adjacent pixels extending along the scan lines have substantially matching output values; and (ii) adjusts output values of selected pixels to intermediate output values in-between the first and second output values based on the patterns detected; and, an image output terminal which supports the first and second output values and the intermediate output values, said image output terminal rendering scan lines output from the image processing unit in accordance with the output values prescribed thereby.

12. The image processing system according to claim 11, wherein the buffer simultaneously stores three of the scan lines sampled by the image processing unit.

13. The image processing system according to claim 11, wherein the buffer is a rolling buffer.

14. The image processing system according to claim 11, wherein image processing unit samples the scan lines along a horizontal direction with respect to the input image.

15. The image processing system according to claim 11, wherein image processing unit samples the scan lines along a vertical direction with respect to the input image.

16. The image processing system according to claim 11, wherein the image processing unit detects patterns defined by runs having lengths greater than three pixels.

* * * * *